United States Patent
Lion et al.

(10) Patent No.: US 6,481,696 B1
(45) Date of Patent: Nov. 19, 2002

(54) FENCE POST TOP CAP FOR TRELLIS

(75) Inventors: Jeff Lion, P.O. Box 1350, Selma, CA (US) 93662; Charles L. Pakchoian, Fresno, CA (US)

(73) Assignee: Jeff Lion, Selma, CA (US)

( * ) Notice: Subject to any disclaimer, the term of this patent is extended or adjusted under 35 U.S.C. 154(b) by 120 days.

(21) Appl. No.: 09/678,538

(22) Filed: Oct. 4, 2000

(51) Int. Cl.$^7$ .................. H01B 17/14; H01B 17/16; E04H 17/00
(52) U.S. Cl. .................. 256/11; 256/47; 256/65.03; 174/158 F; 174/161 F
(58) Field of Search ................. 256/1, 10, 47, 256/65.03; 174/161 F, 158 F

(56) References Cited

U.S. PATENT DOCUMENTS

| | | | | |
|---|---|---|---|---|
| 2,609,418 A | * | 9/1952 | Binns et al. | 256/10 X |
| 2,618,685 A | * | 11/1952 | Lewis | 174/161 F |
| 2,756,958 A | * | 7/1956 | Binns et al. | 174/163 F |
| 3,652,780 A | * | 3/1972 | Wilson | 174/45 R |
| 3,654,383 A | * | 4/1972 | Wilson | 174/163 F |
| 3,807,089 A | * | 4/1974 | Senese | 47/46 |
| 3,820,758 A | * | 6/1974 | Berg | 256/10 |
| 4,077,611 A | * | 3/1978 | Wilson | 256/10 |
| 4,905,968 A | * | 3/1990 | Eby | 256/10 |
| 4,982,932 A | * | 1/1991 | Baker | 256/10 X |
| 5,085,409 A | * | 2/1992 | Teixeira | 256/10 X |

FOREIGN PATENT DOCUMENTS

CA 804183 A * 1/1969

* cited by examiner

*Primary Examiner*—Lynne H. Browne
*Assistant Examiner*—Ernesto Garcia
(74) *Attorney, Agent, or Firm*—Albert O. Cota

(57) ABSTRACT

A fence post top cap for retaining a wire trellis thereon consisting of a sheet metal body (20) configured to fit snugly on the top of a metallic studded fence post. The body includes a front (22), sides (24), a top (26) and a bottom (28) with the sides extending at obtuse angles from the front and having a plurality of bores (40). The top has a bent right angle horizontal lip (42) that extends rearward from the front, with the sides remaining upright forming a U-shape for resting trellis wires on the lip while containing them between the upright sides. The bottom, including the front and sides, conform to fence post exterior dimensions and fit tightly onto the posts concave face (32) with the studs (36) engaging the top cap front. A first cotter pin (44) penetrates the bores (40) in the sides between the posts studs holding the top cap in place vertically and a second cotter pin (46) disposed through similar bores retain trellis wires (48) that are strung between the posts to form a trellis.

16 Claims, 2 Drawing Sheets

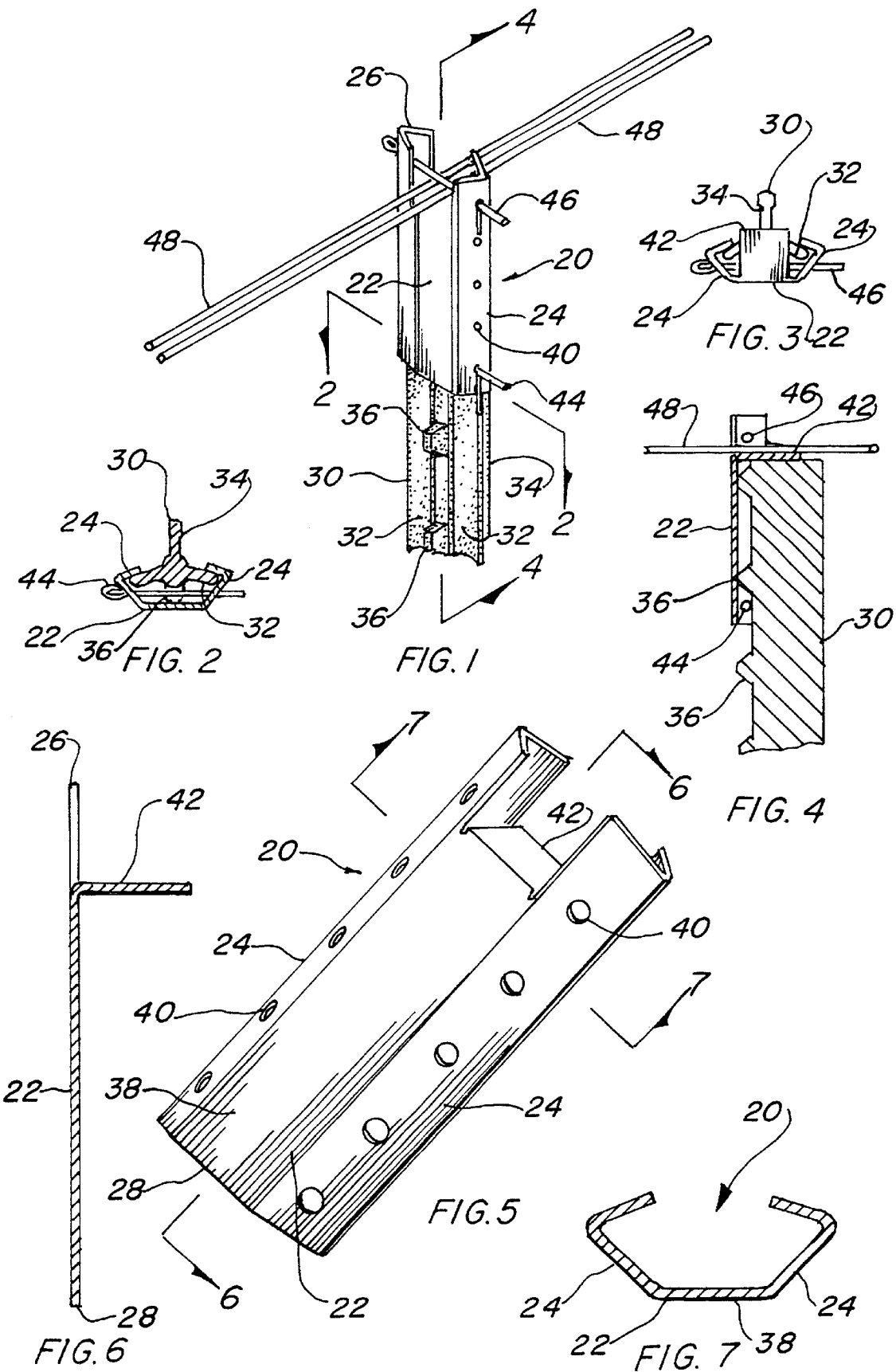

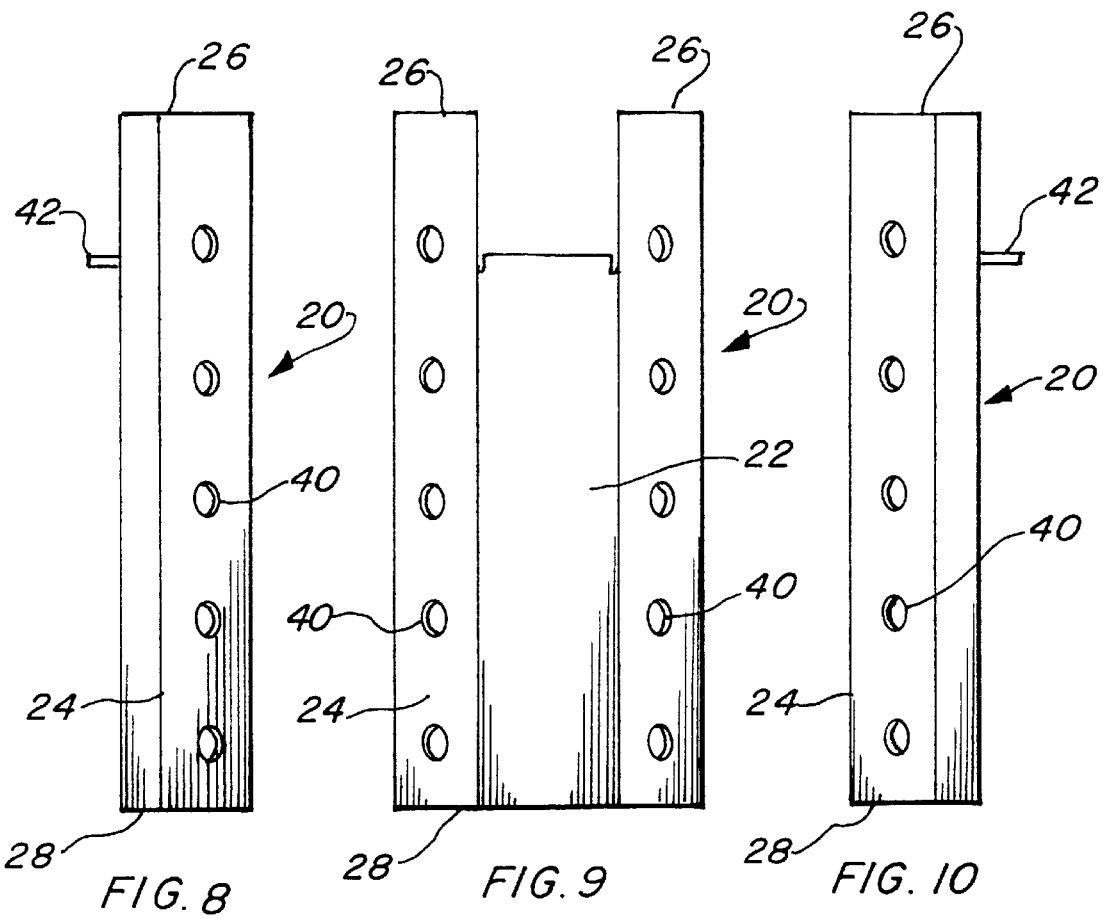
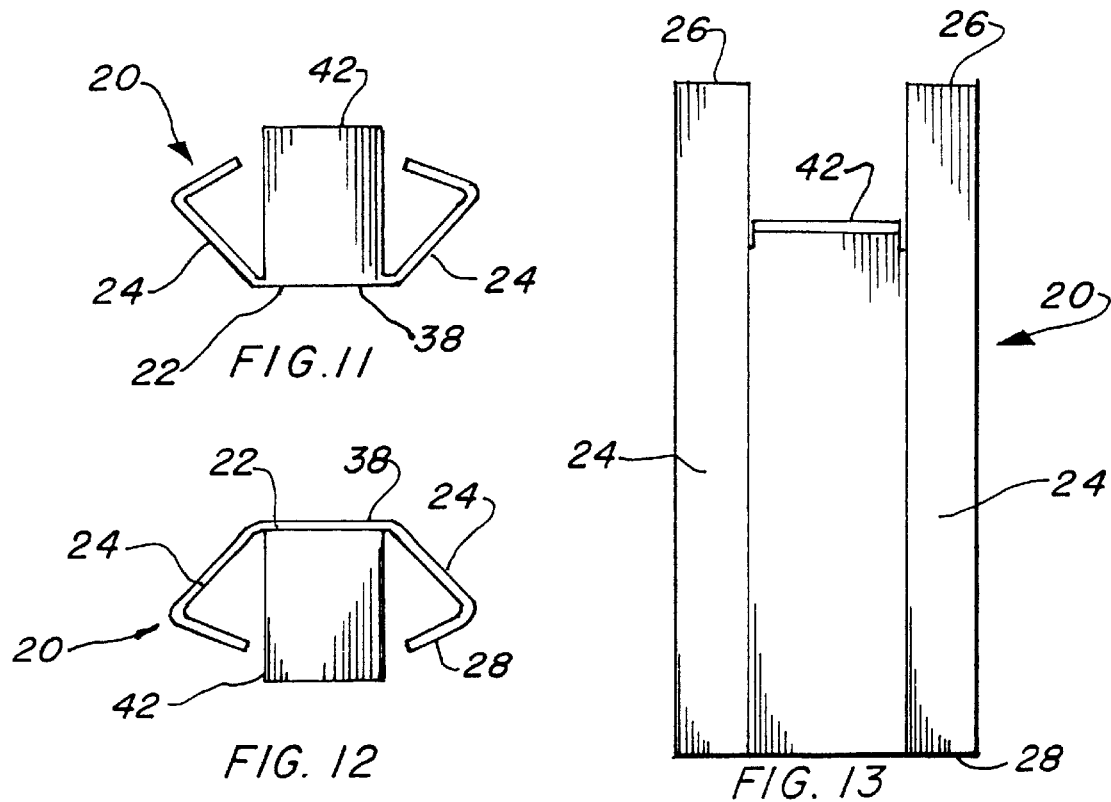

FENCE POST TOP CAP FOR TRELLIS

TECHNICAL FIELD

The present invention pertains to fence posts, in general, and more particularly to a top cap for a fence post used for a retaining wires in a trellis matrix.

BACKGROUND ART

Previously, many types of retaining devices have been used to provide an effective means of forming a wire matrix for growing vine crops. Many types of vine crops require support above the ground to enhance harvesting ability and to minimize damage due to moisture and ground-based detrimental and deleterious affects.

A search of prior art did not disclose any patents that possess the novelty of the instant invention, however the following U.S. patents are considered related:

| Pat. No. | Inventor | Issue Date |
| --- | --- | --- |
| 5,966,867 | Downer et al. | Oct. 19, 1999 |
| 5,438,795 | Galbraith | Aug. 8, 1993 |
| 4,965,961 | Broyles | Oct. 30, 1990 |
| 4,329,811 | Coulson | May 18, 1982 |
| 4,223,872 | Boal | Sep. 23, 1980 |
| 3,791,070 | Roberts | Feb. 12, 1974 |
| 3,411,754 | Fahrenholz | Nov. 19, 1968 |

U.S. Pat. No. 5,966,867 issued to Downer, et al., is for a cross arm which is used at orchards and grapevines to support trees or vines, and that is attached to a fence post that has ribs and outward protruding studs. The cross bar is attached to the post using a U-bolt that is positioned directly above one of the studs holding it securely in place.

Galbraith in U.S. Pat. No. 5,438,795 teaches a grapevine trellis system that incorporates support brackets that are in a "Z" shape and are arranged and constructed to be alternately mounted on a post. The post may be a solid T-bar or metal-roll formed T-shaped post, or the invention may be mounted on conventional wooden posts or stakes.

Broyles in U.S. Pat. No. 4,965,961 discloses a trellis wire support assembly for use with metal grape stakes. The device has a wire support clip and a fastener which secures the clip to the grape stake. The clip is formed having a vertical securement portion with a clip shoulder that engages a mating stake shoulder. Wire support portions extend from the ends of the securement portion and are slotted to movably receive trellis wires. Slots are formed in the device so that the wires cannot be lifted out of the clip during the growing season. A method of adapting the metal grape stake to vertical trellising using the clip is also taught.

Coulson teaches in U.S. Pat. No. 4,329,811 an all metal grape stake that has an elongated upright member which is rolled, forming a v-shape with flanges on each edge. The stake also has a cross-arm in the structure of a metal strip which is bent over across the top of the upright member. A V-shaped bracket is mounted in the center of the cross-arm and receives the upper end of the upright member.

U.S. Pat. No. 4,223,872 issued to Boal is for a wire engager for use with a chain link fence that includes a hollow cylindrical member with a plurality of Z-shaped apertures in the wall of the cylindrical member. While Boal appears to provide a labor saving approach in construction of such fences, this solution is unsuitable for the requirements of a vineyard system where wires are strung in a co-planar matrix at or near the top of the stakes.

Roberts in U.S. Pat. No. 3,791,070 teaches a cross beam for grape stakes that includes a upper planar member supported by a housing member projecting therefrom. The housing member has a lower opening which is fitted on the top of a grape stake. A second planar member projects from the ends of the first planar member at an angle to the end of the housing, and ribs are positioned between the planar members for grasping grape wires. The invention is made of plastic which is rugged and durable. It should be noted that the cross beam of Roberts is nailed to the stake to secure it in position.

For background purposes and as indicative of the art to which the invention is related, reference may be made to the remaining cited U.S. Pat. No. 3,411,754 issued to Fahrenholz

DISCLOSURE OF THE INVENTION

For many years it has been a common practice in the grape growing industry to use a wooden stake that is driven into the ground with a cross member nailed to the top of the stake for supporting wires that form a matrix for bracing the vines. In recent years, metal fence posts have replaced the wooden stakes for strength and durability. A problem has arisen that nails can no longer be used on the metal posts, therefore the need for some other type of attachment means is necessary to retain the wires on top of the metal posts. Therefore, the primary object of the invention is to use a metal post cap that simply slips over the top of the post, thus making it easy and simple to install with the device so configured as to fit a conventional "soil set" fence post configured in a "T" shape. Normally, this type of post has a series of studs on the surface, corresponding to the top of a "T", which are used to tie barbed wire at horizontally spaced intervals. The invention uses the studs to position a top cap away from the front of the post enough to place a fastener in between, with the stud limiting the travel of the cap in an upward direction and the cap itself having a bent lip holding it in place on the top, thus preventing it from slipping down.

An important object of the invention is that the configuration of the top cap is designed such that, even if the top of the post is deformed or bent, the cap has enough spring to open sufficiently to still slide over the top with slight urging on part of the installer.

Another object of the invention is that during normal installation no tools are required and the device is small enough to allow a number of them to be carried together, thus making installation quick and easy. Further, when the cap is positioned over the post, it is locked in place with a cotter pin, which is inserted into mating holes that are located on the sides adjacent to the appropriate stud on the post. The outermost, extended end of the cotter pin is simply bent down by hand, with the other end left horizontal or bent upright as desired.

Still another object of the invention is that metal is used to fabricate the top cap. Prior art has employed thermoplastic as a material for top caps, however, in time the material deteriorates and breakage is common, thus limiting the life of the device. This limiting effect creates severe problems in replacement, as the vines are heavy and hang over the wires, thereby making it difficult to lift them and placing the wires high enough to replace the top cap as it slips over the entire top of the post. The use of metal, preferably steel, creates a long-lasting, durable cap that has the potential of lasting as long as the post itself The cap is further protected by the use of a galvanized plating which prevents corrosion. Additionally, the edges that are exposed after being cut and punched have a thin coat of zinc from the plating as the die wipes across the metal during the manufacturing process.

Yet another object of the invention is that the top cap's material has no effect upon the environment as it is impervious to the elements and when no longer needed may be recycled as steel, which may be used for other purposes.

A further object of the invention is the ease of manufacturing since the cap is easily sheared to size, punched with holes and slots, and formed to shape all by common standard metal working equipment that is well known in the art and readily available. With this in mind, the cost impact of the top caps, relative to its life expectancy, makes their use cost effective.

A further object of the invention is in the design of the upper portion of the cap, which permits wires to be easily installed in any direction even on the side, with the extending upright angles, as the wire may be simply offset in the position required. The formed right angle lip on the top provides an ideal base for the wires and extends the surface of the post top, thus making a smooth platform for the wires which forms the matrix for vines to grip onto. The wires are easily retained from being lifted off of the top by the use of a simple cotter pin threaded though holes in the upright legs after the matrix is properly positioned.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment attached to a soil-set metal fence post with the invention secured in place with a cotter pin and trellis wires on resting on the top of the cap, captivated by a second cotter pin.

FIG. 2 is a cross sectional view taken along lines 2—2 of FIG. 1.

FIG. 3 is a cross sectional view taken along lines 3—3 of FIG. 1.

FIG. 4 is a cross sectional view taken along lines 4—4 of FIG. 1.

FIG. 5 is a partial isometric view of the top cap removed from the fence post for clarity.

FIG. 6 is a cross sectional view taken along lines 6—6 of FIG. 5.

FIG. 7 is a cross sectional view taken along lines 7—7 of FIG. 5.

FIG. 8 is a left side view of the preferred embodiment.

FIG. 9 is a front view of the preferred embodiment.

FIG. 10 is a right side view of the preferred embodiment.

FIG. 11 is a top view of the preferred embodiment.

FIG. 12 is a bottom view of the preferred embodiment.

FIG. 13 is a rear view of the preferred embodiment.

BEST MODE FOR CARRYING OUT THE INVENTION

The best mode for carrying out the invention is presented in terms of a preferred embodiment for a fence post top cap hereinafter "top cap". The preferred embodiment of the top cap is shown in FIGS. 1 thorough 13, and is comprised of a metallic body 20 that has a front 22, a pair of upright angular sides 24, a top 26 and a bottom 28. The body 20 is configured to slide over and partially enclose the top portion of a metal fence post 30. The fence post 30 is the so called soil-set, studded, "T" type. As the term designates, the post 30 is soil-set and is designed to be driven with a post driver directly into the soil without the necessity of being anchored in concrete or the like. The post 30 has a concave face 32 and a "T" shape, with the leg 34 of the "T" being substantially straight and having a series of studs 36 in the center of the "T" which extends beyond the concave face 32, as shown in FIGS. 1 through 4.

The top cap metallic body 20 is preferably formed from sheet metal that is plated with a dissimilar metal coating such as galvanizing the sheet in the flat with a surface treatment of zinc. Alternatively, the completed top cap may also be plated after fabrication with the galvanized coating, or plated with another material such as electrodeposited cadmium, zinc chromate, dichromate or the like. It has been found that 16 gauge (0.0635 inches or 1.613 mm) galvanized steel sheet is ideal for the construction of the top cap, however, other thicknesses ranging from a thickness of from 0.050 inches (0..127 mm) to 0.100 inches (0.254 mm) may also be acceptable.

The front 22 of the cap is formed with a flat face 38 which, when installed, is juxtaposed with the fence post 30 dominant front concave face 32 and contiguously engages the outstanding tips of the studs 36. The front 22 preferably has an inner width of from 0.625 inches (15.88 mm) to 0.850 inches (21.59 mm), as illustrated best in FIGS. 2, 3 and 7.

Each side 24 of the top cap extends at obtuse angles from the front 22, as shown in FIG. 7, at an angle of from 50 degrees to 60 degrees, which permits the cap to wrap around the post 30 while only touching the outside edges of the face 32 and the tips of the studs 36. This configuration and mating technique makes the top cap very forgiving in its installation, as it may be plainly seen that the angles of the sides 24 may be easily bent or slightly deformed to slide over the top of the post 30 with only minimal effort, and yet when in place, the top cap grips the post tenaciously. A further advantage of this configuration is that each manufacturer of this type of fence post 30 may differ slightly in their outline and still be within the industry standard. In all designs, only the angular sides and tip of the studs actually touch the post itself therefore the balance of the rudimentary contour of the post is of little significance.

Each of the sides 24 further contain a series, or plurality, of bores 40 that continue completely through and are spaced in linear alignment in the vertical plane. The bores 40 m each side are also in parallel alignment and are preferably equally spaced apart on centers, from 0.60 inches (15.24 mm) to 0.70 inches (17.78 mm), however, any other spacing may suffice. These bores 40 have a diameter which is sufficient to allow clearance for a fastener such as a cotter pin to penetrate through both sets of bores in a slip-fit manner.

The top 26 is formed by bending a horizontal lip 42 at a right angle, which extends rearward from the front 22 in such a manner that the lip 42 forms a barrier which contiguously engages the upper end of the fence post 30. The sides 24 therefore remain upright, thus forming a U shape therebetween for containing trellis wires on the lip 42 between the upright sides as shown in FIG. 1. It should be noted that the top horizontal lip 42 is equal in length to the remaining sides 24 when formed at right angles to the front 22. This clever arrangement permits the top cap to be sheared in the flat in a rectangle with no further shaping necessary on the outline of the device, thereby simplifying the manufacturing process as only notches and bores need to be added in the flat with simple steel rule dies or computer controlled punching.

The bottom 28 of the cap has an interior dimensional outline compatible with and configured to snugly fit onto a so called T-rail fence post 30 exterior, as previously discussed.

Attachment means in the form of a first cotter pin 44 is positioned through a mating set of aligned bores 40 in the sides 24 to retain the cap in place jointly between the fence post studs 36 and the top lip 42. The first cotter pin 44 may penetrate any of the mating holes according to the position of the studs 36 on the post 30. It should be noted the drawings indicate that four of the bottom bores 40 are located to attach the cap to the post. While this has proven successful, any number of bores may be used with equal ease and dispatch.

Retaining means in the form of a second cotter pin 46 is disposed through a set of aligned bores 40 in the sides 24 to captivate trellis wires 48 between the top horizontal lip 42 and the second cotter pin 46, thus permitting the trellis wires 48 to form a matrix between the posts.

The cotter pins 44 and 46 are preferably zinc plated and are of the extended prong type which have one prong longer than the other for ease of insertion and for bending the longer one down without tools.

During installation the top cap is placed over a fence post 30 that has been driven into the ground. The top cap is then slipped over the top of the post with the front 22 parallel to the concave face 32 of the post. If the fit is obstructed by some deformity in the post, the top cap may be tapped into place by spreading the sides 24 in a spring-like manner. The first cotter pin 44 is then inserted through the set of bores 40 that do not interfere with the studs 36 and the long end of the pin is bent down. Trellis wires 48 are strung between the posts, as required to complete the desired matrix, and when in place, the second cotter pin 46 is inserted through the bores 40 on top of the wires and the long end bent down to lock the wires.

While the invention has been described in complete detail and pictorially shown in the accompanying drawings, it is not to be limited to such details, since many changes and modifications may be made to the invention without departing from the spirit and scope thereof Hence, it is described to cover any and all modifications and forms which may come within the language and scope of the appended claims.

What is claimed is:

1. A top cap for attachment to a studded fence post to captivate trellis wires thereon, said top cap comprising:
    a) a metallic body, having a front, a pair of upright angular sides, a top and a bottom, with said body configured slide over and enclose a top portion of a metal fence post,
    b) said front, formed with a flat face for being juxtaposed with a fence post, having a dominant concave surface, to which the body front flat face is parallel,
    c) each angular side extends at least one obtuse angle from the front, and each angular side having a plurality of bores therethrough,
    d) said top having a bent right angle horizontal lip extending rearward from the front such that the lip forms a barrier for contiguously engaging the fence post's upper end, wherein the sides remain upright forming a U-shaped therebetween for containing trellis wires on the lip between the upright sides,
    e) said bottom having an interior dimensional outline compatible with the fence post exterior,
    f) a first cotter pin disposed through a the pair of the aligned bores in the sides to retain the cap in place jointly between a fence post stud and the top cap horizontal lip, and
    g) a second cotter pin disposed through a distinct pair of the aligned bores in the sides to captivate trellis wires between the top lip and the second cotter pin permitting a plurality of trellis wires to form a matrix.

2. The top cap as recited in claim 1 wherein said metallic body is formed from sheet metal.

3. The top cap as recited in claim 1 wherein said metallic body is plated with a dissimilar metal coating.

4. The top cap as recited in claim 3 wherein said dissimilar metal coating comprises a galvanized inner coating with a surface coat of zinc.

5. The top cap as recited in claim 1 wherein said body has a thickness of from 0.050 inches (0.127 mm) to 0.100 inches (0.254 mm).

6. The top cap as recited in claim 1 wherein said front further comprises an inner width of from 0.625 inches (15.88 mm) to 0.850 inches (21.59 mm).

7. The top cap as recited in claim 1 wherein said side's obtuse angles are from 50 degrees to 60 degrees.

8. The top cap as recited in claim 1 wherein each side bore is equally spaced at the bore centers, from 0.60 inches (15.24 mm) to 0.70 inches (17.78 mm).

9. The top cap as recited in claim 1 wherein said bore diameter on each side is sufficient to allow clearance for said cotter pins in a slip-fit.

10. The top cap as recited in claim 1 wherein said top lip is equal in length to the sides when the top cap is in flat prior to forming the bent right angle horizontal lip.

11. The top cap as recited in claim 1 wherein said bottom of the body comprises a configuration permitting a snug fit onto a T-rail fence post.

12. A top cap for attachment to a metallic, studded, fence post to captivate trellis wires thereon comprising:
    a) a metallic body with a front, a pair of upright angular sides having a plurality of bores therein, a top, a bottom, with said body configured to fit over a fence post, wherein said top further comprises a bent, right angle horizontal lip extending rearward from the front such that the lip forms a barrier which contiguously engages the fence post's upper end, and the sides remain upright thus forming a U-shaped therebetween for containing trellis wires on the lip between the upright sides, and
    b) attachment means to fasten said body to the fence post through the bores, and
    c) retaining means to enclose said trellis wires on top of the body for captivation thereon.

13. The top cap as recited in claim 12 wherein said attachment means to fasten said body through the bores comprises a cotter pin.

14. The top cap as recited in claim 12 wherein said retaining means to enclose said trellis wires further comprises a cotter pin.

15. A top cap for attachment to a metallic, studded, fence post to captivate trellis wires thereon comprising:
    a) a metallic body having a front, a pair of angular sides, a top and an open bottom, said body configured to slide over and enclose a top portion of a metallic fence post, wherein said top further comprises a bent, right angle horizontal lip extending rearward from the front such that the lip forms a barrier, which contiguously engages the fence post's upper end, and the sides remain upright, forming a U-shaped therebetween for containing trellis wires on the lip between the upright sides, b) a first cotter pin disposed through the sides to retain the cap in place between the top of the cap and the fence post studs, and c) a second cotter pin disposed through the sides to captivate trellis wires between the top of the cap and said cotter pin.

16. The top cap as recited in claim 15 wherein said metallic body is formed of sheet metal.

* * * * *